INVENTORS
JAMES L. BAILEY
and
ROBERT F. McCUNE
BY
Brown and Mikulka
and
Sheldon W. Rothstein
ATTORNEYS United States Patent Office 3,642,668
Patented Feb. 15, 1972

3,642,668
MICROPOROUS VINYLIDENE FLUORIDE POLYMER AND PROCESS OF MAKING SAME
James L. Bailey and Robert F. McCune, Dover, Mass., assignors to Polaroid Corporation, Cambridge, Mass.
Continuation-in-part of application Ser. No. 557,993, June 16, 1966. This application Jan. 3, 1969, Ser. No. 790,192
Int. Cl. C08f 47/08; C08j 1/14
U.S. Cl. 260—2.5 M                    18 Claims

ABSTRACT OF THE DISCLOSURE

The pore size distribution range of polyvinylidene fluoride membranes may be governed by the maximum temperature to which the polyvinylidene fluoride solution has been subjected prior to being cast into a membrane.

---

Figure 1:
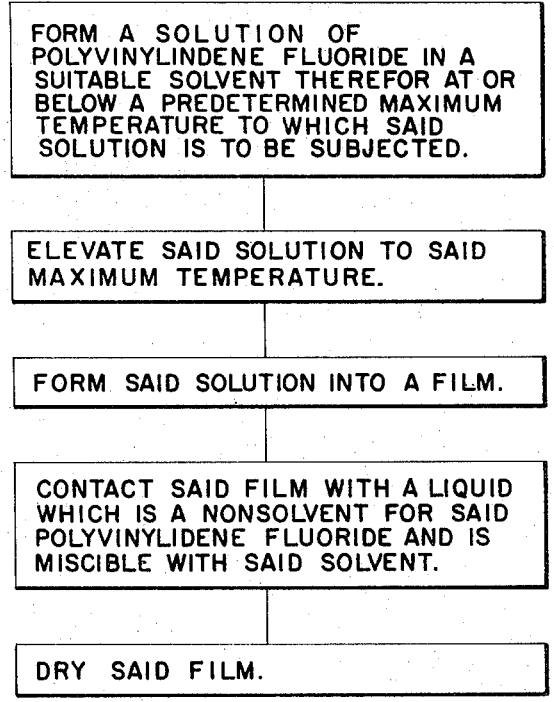

The present application is a continuation-in-part of copending U.S. application of James L. Bailey and Robert F. McCune, Ser. No. 557,993, filed June 16, 1966, now abandoned.

This invention is directed to casting films of polyvinylidene fluoride and, particularly, microporous films which may be utilized in water purification.

In a practical separation process directed toward the extraction of substantially pure water from an impure water solution, the energy required is related to the potentials causing transport of the extracted constituent from the solution.

In order to effect separation of impurities from a volume of nonpotable water it is necessary to physically separate the volume of water into aliquots of different concentrations of impurities. One practical approach to the problem is to use a membrane which is relatively more permeable either to pure water or to salts and other impurities which are to be removed from the original water charge. If, for example, sea water and pure water, both at the same pressure, are separated by a micropermeable membrane, the concentrations of the two liquids tend to equalize by passage through the membrane of impurity or water or both. If the membrane used is more permeable to pure water than impure water, the pure water will dilute the impure water. However, if a pure water migration stimulus is applied on the impure water side of the membrane, pure water will pass from the impure water solution to the pure water side at an appreciable rate. The energy required for this separation process may be supplied in the form of a hydrostatic head differential, wherein impure solution is delivered to the high pressure side of a membrane, and is termed a reverse osmosis process; or in the form of a vapor presure differential accomplished by a heating element which heats the impure solution and thereby raises the vapor pressure of the solvent of the impure solution substantially, termed a membrane distillation process; etc. The primary difference between the reverse osmosis process and the membrane distillation process is the fact that in the former, large hydrostatic pressure differentials are required which necessitates the use of a thick membrane of great strength, while in the latter process, the hydrostatic heads on both sides of the membrane are substantially equal—thereby allowing for the usage of a thinner, more fragile membrane which provides less impediment to solvent transport.

Microporous films anticipated by the present invention are particularly, but not exclusively, adapted for use in the distillation apparatus disclosed and claimed in copending application of Franklin A. Rodgers, Ser. No. 524,366, filed Dec. 27, 1967. The distillation apparatus generally comprises means for transferring heat to a first body of liquid comprising a desired solvent (such as brackish water) to effect transfer of solvent as a vapor across a barrier to a second body of the same solvent from which heat is removed. The barrier is designed to separate the two bodies of liquid so that there is no liquid flow, or leakage, from one to the other, while allowing the vapor of the solvent to pass by diffusion from the evaporating liquid body, to which heat is transferred, to the condensing liquid body, from which heat is withdrawn. The operational efficiency of the apparatus may be greatly affected by the nature and quality of the barried layer which is used. Preferably, the film barrier will comprise a thin sheet of microporous material having a multiplicity of microscopic through pores, or passages, of substantially uniform size which occupy the major portion of the total volume of the film. The pores should be of a maximum size which permit the passage of only the solvent vapor, and any gas dissolved therein substantially at its vapor pressure, without allowing the passage of the liquid. The major proportion of the pores should be of maximum size to provide maximum efficiency with as few smaller sized pores as possible. The smaller sized pores are undesirable in that the vapor will not readily pass therethrough and thus, the overall vapor transmission per unit area of barrier material is proportionately decreased by their presence, thereby decreasing efficiency. Pores of a larger size are intolerable since they may allow the passage of liquid and thereby prevent the apparatus from efficiently performing its separation function. The material used in the formation of the film should be non-wettable by the particular liquid for which the apparatus is designed and/or employed, and have a thermal conductivity as small as possible, since heat-transfer between the bodies of liquid on opposite sides of the film should be restricted as much as possible to that resultant from vapor transfer, rather than by direct conduction of the film. For the purification and desalination of brackish water, it has been found that commercially available polymeric vinylidene fluoride may be formed into effective barrier elements for use in the distillation apparatus.

One of the basic processes used in the preparation of microporous films involves the admixture of a solvent solution of the film-forming material with a liquid, which is a non-solvent for the material and is miscible with the solvent, and forming the mixture into a film. This process is denoted the "solvent-non-solvent" process for forming microporous films. Many variations on the basic process are also known such as those shown in U.S. Pats. Nos. 1,421,341; 3,100,721; and 3,208,875. The "solvent-non-solvent" process is apparently based on the theory that a polymeric material dissolved in a solvent and cast into a film coalesces to form a film by the entanglement of polymer chains. Due to the solvent action of the solvent still remaining in the film at the time of coalescence, the polymer chains still have some freedom of movement so that the number of entanglements may be increased to render the film continuous and non-porous. By contacting the film-forming material with a non-solvent material which is miscible with the solvent present in said material either prior to or subsequent to the formation of the material into a wet film, the solvent action of the solvent is substantially decreased so as to limit chain entanglements and to thus provide formation of a porous polymeric matrix.

According to the above-mentioned copending Bailey and McCune application, of which the instant application is a continuation-in-part, a microporous film of polymeric vinylidene fluoride is provided having a pore volume of at least about 50% and preferably at least 60% wherein a majority and preferably at least about 75% of the pores have a pore diameter of from about 1.0 to about 2.0 microns and less than about 5% of the pores have a pore diameter greater than about 2.0 microns. This microporous film, it is disclosed, may be prepared by forming a solution of polymeric vinylidene fluoride in a solvent therefor, allowing the solution to age for time sufficient to effect formation of a film having the aforementioned uniform pore size distribution, forming the aged solution into such a film, contacting the film with a liquid which is a non-solvent for the polymeric vinylidene fluoride and is miscible with the solvent, removing the film and drying it. Preferably, the resultant microporous film is then baked, for a time sufficient to anneal it, at a temperature insufficient to fuse the polymeric vinylidene fluoride. According to the disclosure in the aforementioned Bailey and McCune application, the ultimate pore volume and pore size distribution may be controlled by the judicious selection of an appropriate aging period.

Subsequent to the filing of the above-denoted Bailey and McCune application, it was discovered that the effective mechanism for producing a given pore size distribution in a polyvinylidene fluoride membrane is probably vaguely, if at all, related to the period the polyvinylidene fluoride solution is aged prior to being formed into a membrane. It is now considered that the ultimate pore size distribution obtained in a given polyvinylidene fluoride membrane is a function of the maximum temperature applied to the polyvinylidene fluoride solution prior to formation of the film.

It is, accordingly, a primary purpose of the instant invention to provide a micropermeable membrane adapted to be used in a distillation process for water purification.

It is a further object of the present invention to provide a technique for the production of uniform membranes described in the paragraph next above.

It is another object of the present invention to control membrane pore size distribution of a polyvinylidene fluoride membrane by controlling the maximum temperature to which the polyvinylidene fluoride solution is subjected prior to casting said solution into a film.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings.

Figure 2:
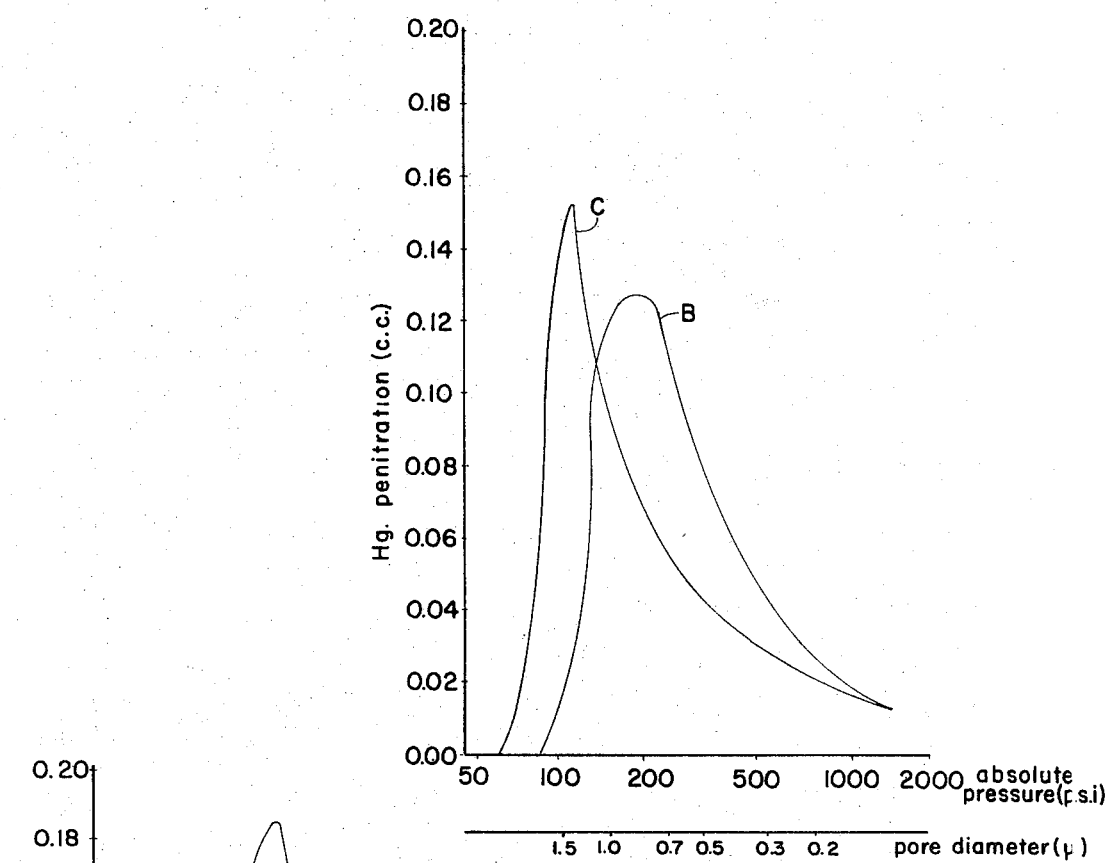

FIG. 1 is a flow diagram of the process of the present invention;

FIG. 2 is a composite graphical illustration of pore diameter distribution achieved in polyvinylidene fluoride membranes formed by solvent—non-solvent processes which differ, one from the other, only in the respective maximum temperatures to which the polyvinylidene fluoride solutions were subjected prior to casting the films—the solutions used to form the membrane of curve A having been subjected to 53° C., and curve B, 34° C., respectively.

Figure 3:
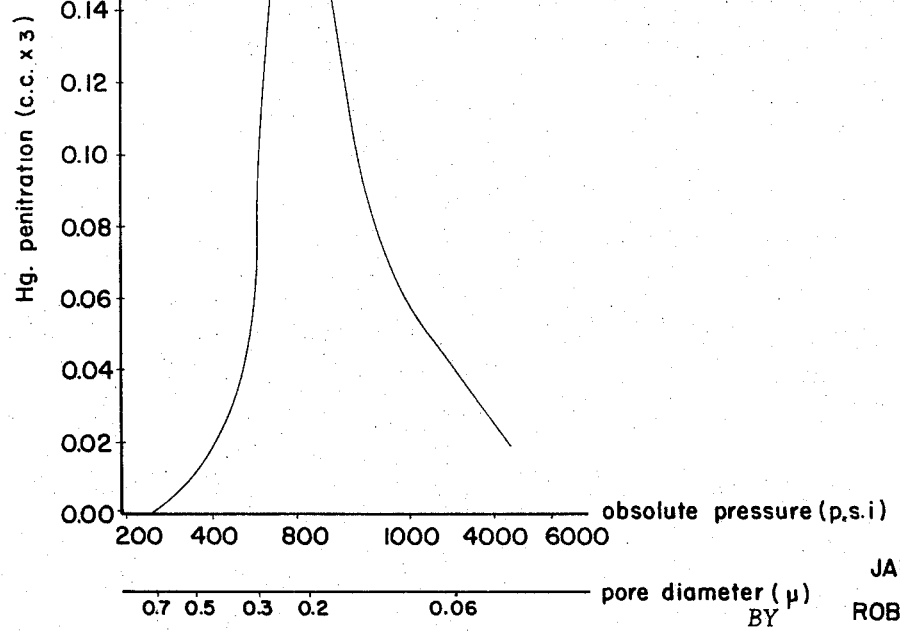
Figure 4:
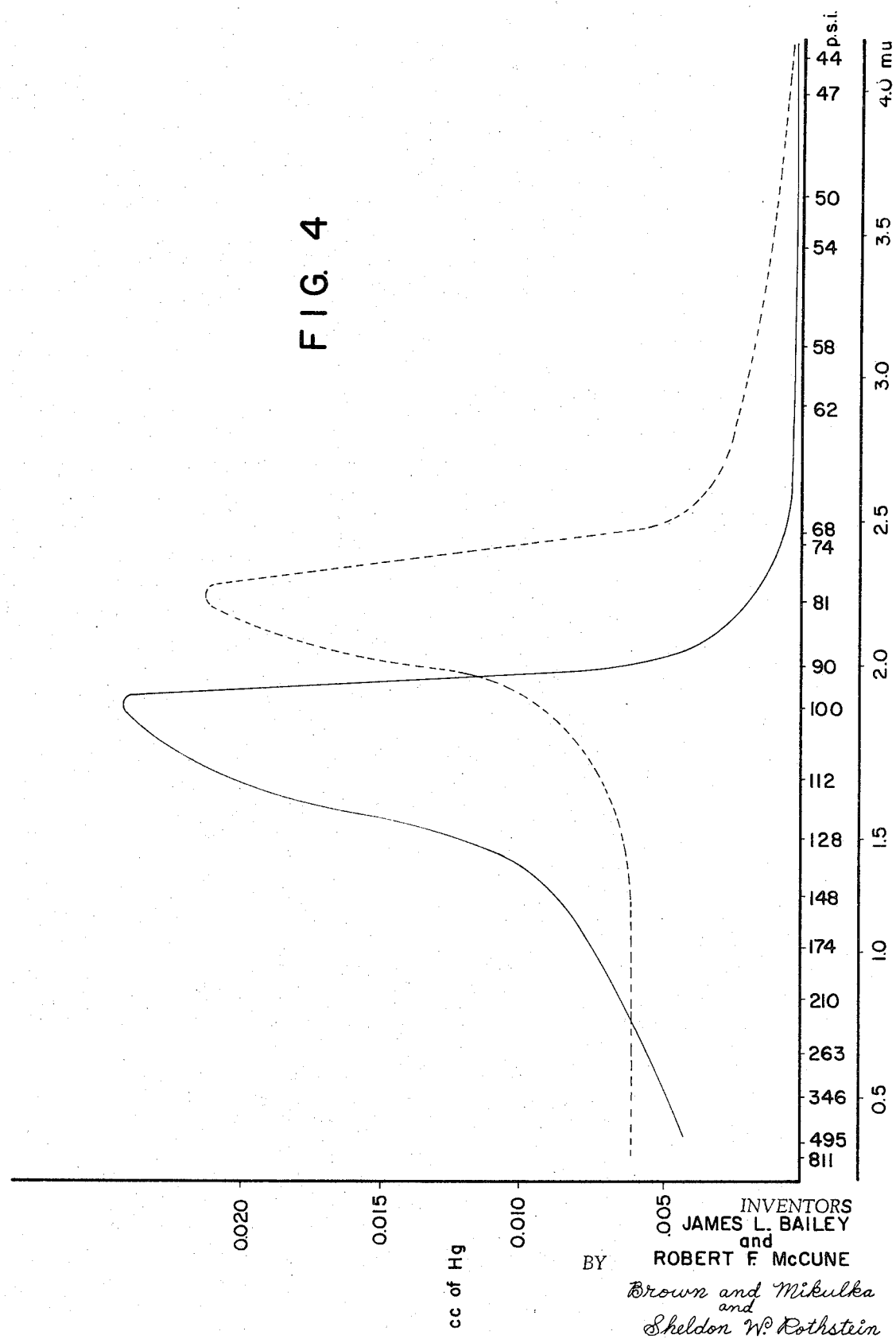

FIG. 3 is a graphical illustration of the pore size distribution of a polyvinylidene fluoride membrane formed from a solution subjected to a maximum temperature of 20° C. prior to casting; and FIG. 4 is a comparative graphical illustration of the pore size distribution of a membrane prepared according to the present invention and a commercially available membrane.

It has been found that excellent separation results may be achieved by employing the distillation apparatus described in the above-denoted Rodgers U.S. patent application when the micropermeable membrane has a pore volume of at least 50% and preferably greater than 60% and the pore diameter distribution range falls substantially between 0.5 to 1.5 microns with preferably more than 75% of the pores falling within this range and a majority of the pores falling within a 0.5 to 1.0 micron range. Utilization of a membrane containing a pore size distribution within this range optimizes the separation results achieved in the above-denoted distillation environment under empirically determined optimum operating parameters but should not be considered a contraindication of the use of membranes with a pore diameter distribution range outside the above-disclosed range since certain separation operations require pore diameters predominately less than 0.5 micron. It will be appreciated that while a predominance of pores in the 0.5 to 1.0 micron diameter range is considered to provide the best mode of operation, adequate results may be obtained when the membranes possess a pore size distribution wherein a majority and preferably at least 75% of the pores are in the 0.5 to 2.0 microns range with less than 5% of the pores having a diameter greater than 2.0 microns. It will be accordingly evident that optimal results with a given set of operating parameters may be achieved by selecting a micropermeable membrane comprising a narrow distribution of pore diameters within the above-denoted 0.5 to 2.0 microns range.

As mentioned above, the polymeric materials used in forming the membranes of the present invention are high molecular weight, film-forming polymers of vinylidene fluoride, the homopolymers being preferred. As illustrative of these materials, mention is made of the polyvinylidene fluoride polymeric materials commercially available from Pennsylvania Salt Manufacturing Company, 3 Penn Center Plaza, Philadelphia, Pa., under the tradename "Kynar" (a homopolymer containing 59% fluorine). Such material may be obtained and used, for example, in the form of a 5 micron size particle powder under the name "Kynar" 301 powder.

The copolymeric materials which may be used in the present invention contain a major proportion of vinylidene fluoride and, preferably will contain at least about 90% vinylidene fluoride. The materials which may be copolymerized with the vinylidene fluoride are ethylenically unsaturated materials which preferably have no functional group other than the

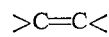

group. Such materials may be illustrated by ethylene, propylene, butylene, vinyl chloride, vinyl fluoride, vinylbromide, vinylidene chloride, ethyl acrylate, methyl methacrylate, etc. The term polymeric vinylidene fluoride as used in the appended claims is intended to include the aforementioned copolymeric materials as well as the preferred homopolymeric material as mentioned hereinbefore.

To form the films of the present invention it is necessary to form a "solution" of the polymeric vinylidene fluoride, as aforementioned. Polymeric vinylidene fluoride does not form true solutions with a solvent but, as indicated in U.S. Pat. No. 3,211,687 to Caperon et al. forms pseudo-solutions with a number of solvents. Such solvents comprise dimethyl acetamide, dimethyl sulfoxide, tetramethyl urea, diethyl acetamide, and mixtures thereof, the preferred material being dimethyl acetamide. These solvents can be used to form suitable pseudo solutions which at room temperature can be effectively formed into polymeric vinylidene fluoride films. While other materials can be used to effect a solvent solution of the polymeric vinylidene fluoride, at, for example, high temperatures, certain of such solvents produce solutions which gel at ambient temperatures and accordingly are of lesser practical value in preparing the film of the present invention.

Wholly unexpectedly, it has been found that pore size distribution prevalent in membranes anticipated by the present invention are governed by the maximum temperature to which the polyvinylidene fluoride solution is subjected. Such a temperature may be the temperature of mixing or it may be some temperature to which the solution is elevated after solvation of the polymer has occurred. For example, as will be more completely discussed hereinbelow, a pore size distribution of from 0.5 to 1.5 microns will be achieved if the maximum temperature to which the polyvinylidene fluoride solution is raised prior to formation of the membrane is about 34° C. Substantially identical results will be achieved if solvation of the polyvinylidene fluoride is accomplished at 20° C. and the solution is subsequently elevated to 34° C. and then cooled and cast at 20° C. as when the solvation temperature is 34° C. and the casting temperature is also 34° C. It is critical to the satisfactory operation of the present invention that the polyvinylidene fluoride solution not be elevated to a temperature higher than the empirically predetermined maximum temperature to produce a given pore size distribution prior to formation of the membrane. It has been determined by a mathematical extrapolation of empirical data that films of polyvinylidene fluoride having pore volumes greater than 50% wherein at least 75% of the pore diameters fall between 0.5 to 2.0 microns with less than 5% of said pores having a diameter greater than 2.0 microns may be formed when the maximum temperature applied to the polyvinylidene fluoride solution prior to forming the membrane falls between about 28° C. and 62° C.

The solution of polyvinylidene fluoride to be used in the present invention is preferably prepared by dissolving the polyvinylidene fluoride in a preferred solvent in a container equipped with an agitator at room temperature. Agitation is continued until solvation has occurred. The solution is then elevated to the temperature which, it has been predetermined, will provide the desired pore size distribution in an ultimately cast membrane. The solution may then be cooled and stored until it is cast. Many different types of equipment for effecting the polyvinylidene fluoride solutions of the present invention under the conditions specified are well known and include, for example, paint mills, colloid mills, etc.

As reported in the last-mentioned Caperon et al. patent, the solvents can dissolve and form solutions containing as high as 30%, by weight, polymeric vinylidene fluoride. However, for forming the microporous films of the present invention, it is preferred that the solutions have a percent polymer in the range from about 15 to 25%, by weight, and most preferably, 20% by weight.

The polyvinylidene fluoride solution prepared according to the process of the present invention is applied to a rigid support member by any suitable coating means. It is preferred to doctor the material onto the support member to provide a substantially consistent thickness throughout the membrane. Optium thickness on a wet basis is about 0.020 inch which produces a membrane approximately 4.5 to 6.5 mils in thickness on a dry basis. As denoted above, the support member with the adherent polyvinylidene fluoride solution may be immersed in a liquid which is a nonsolvent for the polyvinylidene fluoride but which is miscible with the original polyvinylidene fluoride solvent. The adhered polyvinylidene fluoride is allowed to remain in the nonsolvent until the gel structure achieves sufficient physical strength and extraction of the polyvinylidene fluoride solvent is assured. Approximately 10 minutes is employed for this operation. Suitable nonsolvent materials include methanol, ethanol, propanol and higher boiling alcohols, 2-nonane, ethylene, glycol monoethyl ether and its derivatives; etc., methanol being preferred.

The rigid support member includes, for example, glass, metal, or plastics from which the film may be stripped following coalescence. The film may also be cast onto a support material, such as wire screen, nylon or fabric, if the support material is desired to be included in the final product. Other methods, such as casting onto a rotating drum or belt, or onto a silane-modified silicone rubber mold member, as more completely described in copending U.S. application of James L. Bailey and Franklin A. Rodgers, Ser. No. 788,707, filed on the same day as the instant application, may also be utilized.

Next, the adherent membrane is preferably removed from non-solvent bath, oven-dried and the ultimate membrane is stripped from the support member. It has been found that stripping may be facilitated if it is carried out in an aqueous environment.

The solvent solution of the polymeric vinylidene fluoride may, at the option of the operator, be extruded into a non-solvent bath. The use of this procedure obviates the need for casting the solution onto a separate support. The extrusion may be accomplished by forcing the solvent solution through a slotted extrusion die which is positioned slightly above the bath and is moved, relative to the bath, at a speed relative to the rate of extrusion. It has been found that films having a net thickness within the range desired for the present invention can be conveniently formed using a slotted extrusion die having an orifice opening within the range of about 0.005 to 0.015 inch.

The 4.5 to 6.5 mil thick membrane is considered to be of sufficient thickness to be selfsupporting, but is not so thick that vapor transmission efficiency characteristics of the membrane will be detrimentally effected. Ideally, the oven-drying step will be executed at a temperature insufficient to cause the polymeric vinylidene fluoride to fuse—its fusion temperature being approximately 175° C. The preferred baking operation anneals the film thereby removing casting strains and sets the film in a fixed geometrical structure. A baking time of about fifteen minutes is generally sufficient to provide the desired results.

The instant invention will be better understood by a consideration of the examples which follow. Included in the examples will be a discussion of the figures of the drawings which set forth the general procedures to be followed in the practice of the present invention; and demonstrate the pore size distribution of membranes of the present invention.

EXAMPLE 1

Polyvinylidene fluoride membranes having pore volumes of 68.6 percent, 71.3 percent and 69.6 percent, respectively, and predetermined pore size distributions, are prepared according to the following procedures:

Three batches of polyvinylidene fluoride solution are prepared by adding to three 40 gm. aliquots of dimethyl acetamide, maintained at 20° C., 10 gms. of "Kynar 301" powder. Each mixture is stirred for one hour to assure solvation of the polyvinylidene fluoride. Two of the portions of polyvinylidene fluoride solution are then heated to 34° C. and 53° C., respectively, and then cooled to 20° C. Each aliquot is then doctored onto a separate glass support member at 20° C. in a wet thickness of approximately 0.02 inch. Each glass support member, with the adhered polyvinylidene fluoride, is immediately immersed in a bath of methanol for 10 minutes. After removing the adhered membranes from the methanol they are air dried for 30 minutes and then baked in an oven at 150° C. for 15 minutes. Each membrane is then physically stripped from its respective glass support member.

The pore size distributions of the products of Example 1 have been determined using the Skau-Ruska high pressure mercury intrusion test, employing an Aminco-Winslow Porosimeter commercially available from the American Instrument Co., Silver Spring, Md., and the data from the tests are graphically reproduced in the curves of FIG. 2. The curves represent the plotting of the intrusion of mercury in ccs., as the ordinate, against the pressure applied to the mercury in p.s.i., as the abscissa. The abscissa may be mathematically converted to represent pore size diameter employing the expression $d = 2r$ wherein $d$ is pore size diameter in microns ($\mu$) and $$r = \frac{-2\gamma \cos \phi}{p}$$

wherein γ is the surface tension of mercury (Hg), i.e., 69.6181 pounds microns per square inch; φ is the contact angle of mercury against the microporous polyvinylidene fluoride, i.e., about 130°; and p is the pressure applied in pounds per square inch.

The curves clearly indicate that the respective pore size distributions in the membranes prepared in Example 1 are determined by the maximum temperatures applied to said solutions prior to casting. Curve C which represents the pore size distribution of a membrane subjected to a maximum temperature of 20° C. possess pores predominantly in the range of 0.06 to 0.3 micron. Curve B which represents the pore size distribution of a membrane subjected to a maximum temperature of 34° C. possess pores predominantly in the range of 0.5 to 1.5 microns. Curve A which represents the pore size distribution of a membrane subjected to a maximum temperature of 53° C. possesses pores predominantly in the range of 0.6 to 2.0 microns.

EXAMPLE 2

A polyvinylidene fluoride membrane having a pore volume of about 70% with at least 75% of the pores having a diameter of from 1.0 to 2.0 microns and less than 5% having a pore diameter greater than 2 microns is prepared substantially according to the procedure of Example 1 as follows: A 20% solution of polyvinylidene fluoride is prepared by mixing 10 gms. of "Kynar 301" powder in 40 gms. of dimethyl acetamide at room temperature and then subjecting the solution to a maximum temperature of 60° C. The solution is then cooled, stored for three days, doctored onto a polished stainless steel support member in a wet thickness of 0.15 inch and immersed in a bath of methanol for 15 minutes. The film is then air dried at room temperature for 5 minutes, baked at 100° C. for 10 minutes, and stripped from the support member to provide a microporous membrane having a thickness of 5 mils.

The pore size distribution of the product prepared by Example 2 was determined by the same method described in Example 1 and plotted similarly. The curve in FIG. 4 clearly indicates by the area beneath the peak that over 75% of the pores within the film have a diameter within the range of 1.0 to 2.0 microns with less than 5% having pore diameters greater than 2 microns.

Superimposed on the graphic illustration of the pore size distribution of the product of Example 2 is a graphic illustration of the pore size distribution of a commercially available microporous polyvinylidene fluoride material, which illustration is denoted by the broken line curve of the drawing's figure. That product commercially available from the Gelman Manufacturing Company of Ann Arbor, Mich., under the trade designation, VF–6, was tested under conditions identical to those used in obtaining the data used in the preparation of the pore size distribution curve for film of Example 2. The data obtained for the commercial product dictates, as shown by the broken line curve, the finding that the pore size distribution of that product comprises a significant number of pores which are larger than the desired maximum size (2.0 microns) which can be efficiently employed, in the distillation apparatus previously described, for the desalinization of saline water. A comparison of the two graph lines specifically shows that the product of the present invention comprises a film of substantially uniform pore size distribution, within the stated parameters required, whereas the commercially available product does not possess such a distribution.

The importance of the instant designated pore size distribution can be readily noted by a comparison of the thermal efficiency of the film of Example 2 and that of the identified commercially available microporous film, when employed in the aforementioned distillation apparatus of copending application, Ser. No. 456,040. Such thermal efficiency may be defined as a comparison of the actual amount of material distilled (in this case water) per unit power input necessary to maintain the apparatus at a selected operating heat input in relation to the theoretical amount which could be distilled with the same power input if there were no heat loss. Employing a power input of 70 volts and 28 ohms resistance to the water to be transferred, as a vapor, across the membrane, the theoretical yield, at 100% thermal efficiency, will approximate 3.5 cc. of water/minute/6 x 6 x 0.005 inch membrane. Employing the stated input, the product of Example 2 provided a process thermal efficiency equal to 60+% of theoretical and the identified commercially available microporous film provided a process thermal efficiency equal to 38% of theoretical. Such comparison clearly shows that the thermal efficiency of the distillation process employing the stated apparatus is markedly improved using the microporous film of the present invention in comparison with the commercially available microporous film. Such an improvement is extremely important in the commercial operation of a successful brackish or saline water purification system.

In addition, application of more than 4 to 7 p.s.i. (gauge) air pressure to a body of water in contact with the commercially available microporous membrane will cause water to ooze through the membrane, whereas the product of Example 2 will withstand application of 15 to 21 p.s.i. (gauge) pressure by reason of the limited number of pores exceeding 2.0 microns in diameter.

In the following example, another procedural embodiment of the invention is illustrated and provides a membrane exhibiting substantially the same properties as those exhibited and detailed with reference to the product of Example 2.

EXAMPLE 3

A microporous membrane according to the present invention was prepared by forming a 15% by weight polyvinylidene fluoride solution by mixing 10 gms. of "Kynar 301" powder in 56 gms. of dimethyl sulfoxide and subjecting the solution to a maximum of 60° C. The solution was then cooled to room temperature, stored for five days, and extruded through a slotted extrusion die having a slot width of 0.010 inch directly into a methanol bath. After 10 minutes the film was removed and supported on a metal support to dry. It was then baked for 10 minutes at 90° C.

The film formed in accordance with the present inventon is especially effective in distillation apparatus in that it tends not to be wetted by the brackish or saline water being purified. However, should the film tend to become wetted by a solution to be purified, materials may be applied to the surface of the film to overcome this defect. For example, the film may be coated with silicone water repellent such as the material sold by the General Electric Company under the trade name "Dri-film" number 1040 or 1042 or designated as SS 4029. The coating of a waterproofing compound of this type, rendering the porous film non-wettable, is extremely thin and has been found to have no measurable undesirable effects on water vapor transmission.

While the applicants herein do not profess to understand the mechanism which is deteminative of the pore size distribution prediction phenomenon disclosed herein, they suggest that it probably involves a substantially irreversible reaction between the polyvinylidene fluoride and its solvent, the extent of said reaction or interaction being governed by the maximum temperature to which the polymer solution is subjected.

While the present invention has been directed toward a microporous polymeric vinylidene fluoride film particularly adapted for use in the distillation apparatus of the aforementioned copending application Ser. No. 456,040, the invention is in no way limited thereto. Such microporous films may also be used in other areas where microporous films are conventionally employed, such as microbiological applications with pore diameters in the area of 0.05 micron; filtering of oil; the lubrication of miniature bearings; the filtering of rocket engine fuel; organic solvent filtration, etc. The present invention specifically is capable of providing microporous films of polyvinylidene fluoride which exhibit a sufficiently high degree of pore size uniformity and pore volume so as to provide for the efficient employment of the film in various filtration or liquid purification processes.

Since certain changes may be made in the above process and product without departing from the scope of the invention herein involved, it is intended that all matter contained in the above description and shown, in the accompanying drawing shall be interpreted as illustrative and not in a limiting sense.

What is claimed is:

1. A microporous membrane comprising a polymer comprising at least 90% vinylidene fluoride having a pore volume of at least 50% wherein a majority of said pores have a pore diameter within the range of 0.5 to 2.0 microns.

2. The invention of claim 1 wherein less than 5% of said pores have a pore diameter greater than 2 microns.

3. The invention of claim 2 wherein at least 75% of said pores have a pore diameter between 0.5 to 1.5 microns.

4. The invention of claim 2 wherein at least 75% of said pores have a pore diameter between 0.5 to 1.0 micron.

5. A microporous membrane comprising a polymer comprising at least 90% vinylidene fluoride having a pore volume of at least 50% wherein a majority of said pores have a pore diameter of from about 1.0 to 2.0 microns and less than about 5% of said pores have a pore diameter greater than 2.0 microns.

6. The invention of claim 5 wherein at least 75% of said pores have a pore diameter of from substantially 1.0 micron to 2.0 microns.

7. A method for preparing a microporous membrane comprising a polymer comprising at least 90% vinylidene fluoride which comprises:
   (a) forming a pseudo solution of a polymer comprising at least 90% vinylidene fluoride in a solvent therefor;
   (b) heating said solution to a predetermined maximum temperature to provide a pore size distribution in the ultimately formed membrane wherein a majority of said pores have a pore diameter within the range of 0.5 to 2.0 microns;
   (c) forming said solution into a film;
   (d) contacting said film with a liquid which is a nonosolvent for said polymer of vinylidene fluoride and is miscible with said solvent; and
   (e) drying said film.

8. The invention of claim 7 wherein said membrane has a pore volume of at least 50%.

9. The invention of claim 8 wherein less than about 5% of the pores have a pore diameter greater than 2.0 microns.

10. The invention of claim 9 wherein said solvent is dimethyl acetamide.

11. The invention of claim 10 wherein said polymer comprising vinylidene fluoride is present in a solution containing about 15–25 weight percent of vinylidene fluoride polymer.

12. The invention of claim 11 wherein said polymer comprising vinylidene fluoride is present in about 20 percent solution.

13. The invention of claim 12 wherein the maximum temperature to which said solution is subjected is within the range of about 28° C. to 62° C.

14. The invention of claim 13 wherein a majority of said poles have a pore diameter of from 0.5 to 1.5 microns.

15. The invention of claime 13 wherein the maximum temperature to which said solution is subjected is about 34° C.

16. The invention of claim 15 wherein a majority of said pores have a pore diameter of from 0.5 to 1.0 microns.

17. The invention of claim 16 wherein said nonsolvent liquid is methanol.

18. The invention of claim 17 wherein, subsequent to drying, the films is over backed at a temperature of approximately 150° C.

References Cited

UNITED STATES PATENTS

| | | | |
|---|---|---|---|
| 2,997,448 | 8/1961 | Hoehberg | 260—2.5 M |
| 3,450,650 | 6/1969 | Morata | 260—2.5 M |

MURRAY TILLMAN, Primary Examiner

M. FOELAK, Assistant Examiner

U.S. Cl. X.R.

161—159; 260—30.8 DS, 32.6 R, 33.4 R, 92.1; 264—299, 331, DIG 13, DIG 62